United States Patent Office 2,778,798
Patented Jan. 22, 1957

2,778,798

COLOR INDICATION MEANS AND METHOD FOR ION EXCHANGE MATERIAL

George H. Klumb and Murl B. Sailsbury, Northbrook, and Robert E. Schulze, Deerfield, Ill., assignors to Culligan, Inc., Northbrook, Ill., a corporation of Delaware No Drawing. Application November 10, 1953, Serial No. 391,382

4 Claims. (Cl. 210—24)

The present invention relates to a novel method or manner of and means for indicating the quality of liquids treated or produced by ion exchange materials and also to the state or condition of such ion exchange or treating materials, reference being made to the co-pending application of Messrs. Klumb, Schulze, Roach and Sailsbury, Serial No. 348,014, filed April 10, 1953, assigned to the common assignee, Culligan, Inc.

Certain chemical substances may be used to indicate by means of color changes and/or precipitates the degree of presence of other chemical substances, and electrical and optical means may also be employed to indicate the degree of presence of chemical substances. However, such general methods of indication when used in a specific application are frequently found to give erroneous results, to be inadequate, or to be completely unusable or unsuitable in their present forms, thus requiring that new methods or manners of indication or detection be discovered for specific applications.

Of the above mentioned methods for the indication of the degree of presence of chemical substances, many are found to have a deleterious effect upon the substance or substances tested, rendering the substance or substances unsuitable for their intended use or uses, i. e. to make evaluation tests on a portion of a substance and then to apply the test results to the whole of which the evaluated portion is considered to be representative. The evaluated portion is frequently discarded, or may be filed away for reference purposes so that only the remainder which has not been subjected to evaluative tests is available for use.

The present invention provides for convenient and unique means and novel method for indicating the quality of fluids produced or treated by ion exchange material and also the state of the ion exchange material whereby the disadvantages and objections to such prior means and methods are obviated.

Specific conductance and/or specific resistance of liquids have been determined for various concentrations of many dissolved chemical substances. Concentrations are expressed in such terms as p. p. m. (parts per million), g. p. g. (grains per gallon), normality, molarity, molality, etc., with specific conductance expressed in terms of mhos, and specific resistance in terms of ohms. For example, a commercially available graph shows that a 4 part per million of $Na_2CO_3$ has a specific conductance of about 10 micromhos and a specific resistance of about 100,000 ohms, and that a 6 part per million solution of $NaHCO_3$ has a specific conductance of about 6.8 micromhos and a specific resistance of about 150,000 ohms. Because of these relationships in certain applications it is contemplated to measure the quality of liquids treated or prepared by ion exchange material by determining their respective specific resistances and/or their specific conductances.

The examples cited in this application illustrate that when the removal of ions from the liquids treated or processed by indicator-bearing ion exchange material in accordance with the present invention has reduced the activity of the ion exchange material for the removal of ions to a certain state, a change occurs in the indicator material resulting in an alteration in its color, or resulting in a color dispersal from the particles of ion exchange material into the liquids being treated or processed by the ion exchange material.

The quality of the treated liquid can be ascertained in ohms specific resistance, for example, and then converted to parts per million, grains per gallon, etc. Since the change which takes place in the indicators described in this application can be correlated with specific resistance in ohms, the various endpoints of these indicators can serve as a convenient and highly satisfactory measure of the quality of the liquids treated or processed by ion exchange material and also the state of the ion exchange material in many and varied applications.

It is, therefore, an important object of this invention to provide a novel means for indicating, with substantial accuracy, when the quality of a liquid as measured in such terms as parts per million, grains per gallon, specific resistance, etc., produced or treated by ion exchange material is above or below a previously selected standard. More specifically, according to this object, it is possible to determine by visual or other means when the quality of the liquid produced or treated by ion exchange materials is above or below a previously selected standard, for example, 15,000 or 50,000 ohms specific resistance. It is possible to vary the indicated quality of the liquid produced or treated by ion exchange materials through selection of indicator materials. According to this object, the degree of accuracy of indication of quality makes it highly desirable for certain applications.

Another object of the present invention is to provide a novel means for indicating the state of the ion exchange material and particularly the degree to which it is active or spent. More specifically, according to the present invention, it is possible to determine by visual or other indicating means when the previously selected degree of activity or exhaustion of the ion exchange material has been reached. Furthermore, it is possible to vary the indicated endpoint of the ion exchange material as required through selection of indicator materials.

A further object of the present invention is to provide a novel method for indicating the quality of liquids treated or produced by ion exchange material, said method being unique and highly effective in that in a novel embodiment of the indicator materials used are not deleterious from a physiological standpoint and do not impair the potability of the liquid. A most unique aspect of this invention is that the indicator materials referred to are certified by the Pure Food and Drug Administration as being safe for human and animal consumption.

It is a unique and highly desirable feature of the present invention to provide a novel method employing certified FD & C (Food, Drug & Cosmetic) dyes as indicators for the desired quality of liquids treated or produced by ion exchange material, and also the state of the ion exchange material. This invention makes it possible to use dyestuffs intended solely for use as coloring agents for foods, beverages, and the like, as chemical indicators in an entirely different, unobvious and novel application. The advantages of this are apparent in that dyestuffs outside the FD & C category are considered unsafe for human use from a physiological standpoint, and dyestuffs within the FD & C category are the only ones considered safe from the physiological standpoint. This invention completely obviates the deleteious effects which might result from the ingestion of fluids treated or produced by ion exchange material using or incorporating non-certified dyestuffs as indicators of the quality of fluids produced by them.

According to the present invention, ion exchange materials are treated with chemicals in such manner that the quality of the liquid produced or treated by or with them is positively indicated. One unique aspect of this invention is to utilize chemicals as indicators and to give thereto functions of indication which have not previously been known or believed capable of functioning as such. More specifically, reference is made to some chemicals which heretofore have been used to impart color to foods and other substances.

When ion exchange material is treated with a chemical substance to determine whether the chemical substance will serve as an indicator of the quality of the liquid treated or processed by the ion exchange material, this ion exchange material usually reacts in one of the following ways: (1) the ion exchange material takes on the color of the chemical substance used to treat it, (2) the ion exchange material takes on a color different from that of the chemical substance used to treat it, or (3) the ion exchange material even though it has adsorbed the chemical substance completely or substantially retains its original color and is apparently uncolored by the chemical substance used to treat it. Example (3) above represents instances where dyestuffs do not function as dyes and is of primary importance in certain applications of the present invention. The degree to which the ion exchange material is active or spent is an important fatcor in this phenomenon.

The following are illustrative:

*Example 1.*—Hydroxide regenerated anion exchange material of the quaternary ammonium type (hereinafter referred to as anion exchange material) was treated with the dyestuff known as FD & C Orange No. 1 (as identified in Encyclopedia of Chemical Technology, vol. 4, pp. 287–313, copyright 1949, by The Interscience Encyclopedia, Inc.), and also as Orange I. The solution of the dyestuff was deep wine red in color and the treated anion exchange material was also a deep red in color.

*Example 2.*—(a) Anion exchange material was treated with the dyestuff known as FD & C Red No. 1, and also as Ponceau 3R. The solution of this dyestuff was bright red in color and the treated anion exchange material was a blackish maroon in color when rinsed free of excess dyestuff.

(b) Anion exchange material was treated with the dyestuff known as FD & C Blue No. 1. The solution of this dyestuff was a deep blue in color and the treated anion exchange material was a medium maroon in color when rinsed free of excess dyestuff.

(c) Anion exchange material was treated with the dyestuff known as FD & C Blue No. 2 and also as sodium indigo disulfonate. The solution of the dyestuff was an intense blue in color and the treated anion exchange material was a deep brownish black in color when rinsed free of excess dyestuff.

*Example 3.*—Anion exchange material was treated with the dyestuff known as FD & C Green No. 1 and also as Guinea Green B. The solution of the dyestuff was a deep green in color and the treated anion exchange material was unchanged in color when rinsed free of excess dyestuff.

The phenomenon of the color changes of chemical substances heretofore used for an entirely different purpose is an important aspect of some of the embodiments of this invention. Example 3 above is a most unique aspect of this invention in that a substance is treated with and has adsorbed a dyestuff of intense color and yet the substance, in this case anion exchange material, is substantially unchanged in color. Subsequent revelations in this invention show that this apparent absence of color is the basis for a most useful means for indicating the state of an ion exchange material, and/or the quality of the liquids treated or processed by ion exchange material.

The ability of a chemical substance to impart the same, a different, or substantially no color to ion exchange material when the ion exchange material is treated with it, provides additional as well as supplementary means for screening and selecting the indicator materials.

The potential chemical indicators which are referred to in this invention, can be identified by first treating the ion exchange material with a chemical substance, next placing the treated ion exchange material on a microscope slide, and finally placing on or with the treated ion exchange material which is on the slide a solution of a suitable, ionizable chemical compound. The indicators referred to here are those, which under the above conditions: (1) release a color into the liquid on the slide, or (2) undergo a change in color, this change in color taking place on the ion exchange material itself.

The degree of regeneration of the ion exchange material and the kind of regenerant, acid, weak or strong base, etc. also has a bearing on the identification of potential indicators. From the examples already cited, and from those which follow, it will be apparent that potential indicators may be of one color or no color when the ion exchange material is in an active regenerated state and of another color when at some degree of exhaustion.

In an important commercial application of this invention, the combination of ion exchange material and indicator substance was prepared by taking 2.002 gms. of FD & C Violet No. 1 and placing it in a beaker with 100 ml. of the active anion exchange material in the hydroxyl state and approximately 100 ml. of deionized water. This mixture was stirred for one hour and then permitted to stand for one day.

While this was a typical method employed, it is not essential that the indicator material be applied in this specific manner. The simple technique of merely placing the indicator material and its solvent in a suitable container and letting this mixture stand until the indicator material has sufficiently penetrated or adhered to the ion exchange material will serve in certain cases.

Another alternative is to permit the indicator material to percolate through the ion exchange material which is held in a column or other suitable container, at a flow rate which permits suitable penetration of or adherence to the ion exchange material.

Yet another system is to mix the indicator and the specific regenerant for the ion exchange material and then treat the ion exchange material with them simultaneously, in accordance with the methods described above or contemplated.

The ion exchange material which has been treated with the indicator is then rinsed free of excess indicator by using the solvent for the indicator or other suitable rinsing agent.

Various means of rinsing may be used satisfactorily. One of the most efficient is to place the treated ion exchange material in some suitable container and pass the rinsing agent through it.

The quality of chemical purity of the processing or rinsing agent is not necessarily of importance. The sequence of steps to produce the final combination of ion exchange material and indicator determines the importance of the quality or purity of the processing or rinsing agents.

The final result of the above process should be adequately regenerated ion exchange material having associated therewith the indicator substance. If the ion exchange material enters the process in a regenerated form and it is desired to retain it in its regenerated form, impurities in the processing or rinsing agent could reduce its functional capacity for ion exchange purposes.

If the ion exchange material enters the above process in an exhausted form, the quality of the processing and rinsing agent is only of relative significance, since the ion exchange material must be regenerated after the conclusion of rinsing.

In certain applications of the above process it is found that the degree of regeneration of the ion exchange material is of much importance. Processed, under-regenerated ion exchange material will frequently not indicate the quality of the liquid or liquids treated or produced. It is thus desirable to have the ion exchange material regenerated to a very high degree before final use for the proper function of certain of the indicators.

In another instance a 1000 ml. settled volume of active anion exchange material in the hydroxyl state was treated with 14.0 gms. dry weight of FD & C Violet No. 1. This mixture was stirred in a large beaker for 4 hours and then immediately rinsed with deionized water until the ion exchange material was free of excess dye. For convenience in rinsing, the treated ion exchange material was placed in a column with inlet and outlet openings for the rinsing agent. The resulting ion exchange material had a light color resembling the natural color of the original commercial anion exchange material.

This is a most important discovery in that this dyestuff known as FD & C Violet No. 1, although its function is to impart color to various substances, in this application the customary violet color of the dyestuff is not imparted to the dyed substance. This is entirely novel in that a modification in color is induced in a dyestuff used heretofore solely for color effects and the discovery that this modification in color can be successfully used to indicate the condition of ion exchange material for ion exchange and/or the quality of the liquids treated or processed therewith. That the ion exchange material contains the dyestuff, even though the color of the dyestuff is not evident, will be revealed subsequently. A most unique aspect of this discovery is that dyestuffs dealt with in this and other examples given are dyestuffs certified for use in foods, drugs and cosmetics.

In the above instance, the anion exchange material was regenerated into the hydroxyl form before being treated with the dyestuff (indicator substance) and then treated with the dyestuff (indicator substance) as above.

A 54.0 ml. settled volume portion of the above treated anion exchange material was placed in a flexible container along with a 40.0 ml. settled volume of acid regenerated cation exchange material of the sulfonated polystyrene type (hereinafter referred to as cation exchange material) and made into a unit for the treatment of liquids as described in copending application Serial No. 348,014. This particular unit was then used to treat soft tap water having approximately 9 grains per gallon dissolved ionizable solids. After 14,250 ml. of such water had been treated by this unit some of the particles of ion exchange material had changed from their original light color to a purplish color. At this point, the charge of water had been treated by the unit for one minute and had a specific resistance of 240,000 ohms. After 25,490 ml. of such water had been treated by this unit, most of the particles of the anion exchange material had changed in color. After 26,260 ml. of such water had been treated by this unit, the color change of the particles of anion exchange material was considered substantially complete. At this point, the charge of 310 ml. of water had been treated by the unit for one minute and had a specific resistance of 6,000 ohms.

In another application, 100 ml. settled volume of hydroxide regenerated anion exchange material was treated as described below with 2.001 gms. dry weight of the dyestuff known as FD & C Green No. 1 and also as Guinea Green B.

The anion exchange material was placed in a beaker with the dyestuff. 100 ml. of deionized water were then added to the contents of the beaker, which were stirred for 50 minutes and permitted to stand for one day. The treated anion exchange material was then washed with deionized water into a column where it was rinsed free of excess dyestuff. The resulting anion exchange material had a light color resembling the natural color of the original commercial anion exchange material.

A 27.0 ml. settled volume portion of the above regenerated and treated anion exchange material was placed in a flexible container along with 20.0 ml. settled volume of acid regenerated cation exchange material and made into a unit for the treatment of liquids as described in copending application Serial No. 348,014. This particular unit was then used to treat well water having approximately 45 grains per gallon dissolved ionizable solids. After 2,180 ml. of such water had been treated by this unit, some of the particles of anion exchange material had changed from their light color to a very striking green color. At this point, a single 155 ml. charge of water had been treated by the unit for one minute and had a specific resistance of 10,500 ohms. When the total volume of treated water had reached 2,765 ml., the change to the green color of the treated anion exchange material was considered substantially complete. At this point, a single 130 ml. charge of water had been treated by the unit for one minute and had a specific resistance of 10,000 ohms. The charges of water were placed in the unit and emptied from it, in this particular example, intermittently over a period of eight days.

The dyestuff called FD & C Green No. 2, and also commonly known as Light Green SF Yellowish, is another example of an indicator which can be used. 100 ml. of hydroxide regenerated anion exchange material were placed in a beaker with 2,000 gms. of dyestuff FD & C Green No. 2 and 100 ml. of demineralized water. This mixture was stirred for 45 minutes and then permitted to stand for 44½ hours. The regenerated and treated anion exchange material was then placed in a column where it was rinsed with demineralized water until free of excess dyestuff. Although the dye solution itself was deep green in color, the color of the treated regenerated anion exchange material appeared to be unchanged.

A 27.0 ml. settled volume portion of the above treated anion exchange material was placed in a flexible container of approximately 8 ounces capacity along with 27.0 ml. settled volume of acid regenerated cation exchange material and made into a unit for the treatment of liquids as described in copending application Serial No. 348,014. This particular unit was then used to treat well water having approximately 45 grains per gallon dissolved ionizable solids. In this example, the charges of water were placed in the unit and emptied from it intermittently over a period of several days. After 2,565 ml. of such water had been treated by the unit, a few of the particles of anion exchange material had changed from their natural color to a distinct green color. When the total volume of such water treated by this unit had reached 3,025 ml. the change in color of the particles of the anion exchange material from their natural to green color was considered substantially complete. At this point a single 150 ml. charge of water had been treated by the unit for one minute and had a specific resistance of 15,000 ohms.

The dyestuff called FD & C Green No. 3 and also known as Fast Green FCF, is another example of an indicator which can be used. A dry weight of 2.001 gms. of this dyestuff was added to a 100 ml. settled volume of hydroxide regenerated anion exchange material. To this was added 100 ml. of demineralized water. This mixture was stirred for 60 minutes in a beaker and permitted to stand for 26¾ hours. The regenerated and treated anion exchange material was then washed with demineralized water until free of excess dyestuff. Although the dye solution itself was deep green in color, the color of the treated regenerated anion exchange material appeared to be unchanged.

A 27.0 ml. settled volume portion of the above treated anion exchange material was placed in a flexible container of approximately 8 ounces capacity along with 20.0 ml. settled volume of acid regenerated cation exchange material and made into a unit for the treatment of liquids as described in copending application Serial No. 348,014. This particular unit was then used to treat well water having approximately 45 grains per gallon dissolved ionizable solids. In this example, the charges of well water were placed in the unit and emptied from it intermittently over a period of four days. After 775 ml. total volume of such water had been treated by this particular unit, a few of the particles of the treated anion exchange material had changed from their natural color to a bright green color. After 2,515 ml. of such water had been treated by this particular unit, many of the particles of the treated anion exchange material had changed to a bright green color. At this point, a single 150 ml. charge of water had been treated by the unit for one minute and had a specific resistance of 45,000 ohms. The unit was allowed to stand for 2 days. At that time, a single 150 ml. charge of water treated for one minute by the unit had a specific resistance of 70,000 ohms and the change in color of the particles of the anion exchange material from their light color to a deep green color was considered substantially complete.

This example provides another illustration of the manner of indicating the quality of fluids treated or produced by ion exchange materials covered in copending application Serial No. 348,014, and in addition shows methods for the use of the indicator materials. In the following example, the dyestuff known as FD & C Orange No. 1 and also as Orange I, was used. A 100 ml. settled volume of hydroxide regenerated anion exchange material was placed in a beaker with 2.005 gm. dry weight of the color dyestuff. To this was added approximately 75 to 100 ml. of deionized water. This mixture was then stirred for 45 minutes and permitted to stand for 64 hours, after which it was placed in a column and rinsed free of excess dyestuff. The original dyestuff solution had a bright wine red color, while the particles of anion exchange material were colored a deep red.

Some of these treated particles of anion exchange material were placed on a "well" type microscope slide in the manner previously described in this application and treated with 1:1 HCl and examined under a microscope. HCl in this particular concentration was used because it was readily available in a reagent bottle; higher or lower concentrations would serve the same purpose. The particles of anion exchange material plus the HCl in the well slide took on a noticeable fuzzy appearance and some color appeared in the liquid on the slide.

The quantity of indicator material was increased in another example. To 75.0 ml. settled volume of hydroxide regenerated anion exchange material was added 4.828 gms. dry weight of the same dyestuff, FD & C Orange No. 1. A 75.0 ml. volume of demineralized water was then added to the mixture of dyestuff and anion exchange material in the beaker. This mixture was then stirred for 45 minutes and permitted to stand for 24 hours, after which it was placed in a column and rinsed free of excess dyestuff. In this instance, the original indicator solution had a bright wine red color and the particles of anion exchange material were a deep red color. A few particles of the treated anion exchange material were placed in a well slide and treated with HCl in the manner previously described. Examination under the miscroscope revealed that the beads soon became fuzzy and that some color was present in the liquid on the slide.

A 27.0 ml. settled volume portion of the above treated anion exchange material was placed in a flexible container of approximately 8 ounces capacity along with 20.0 ml. settled volume of acid regenerated cation exchange material and made into a unit for the treatment of liquids as described in copending application Serial No. 348,014. This particular unit was then used to treat well water containing approximately 45 grains per gallon dissolved ionizable solids. In this particular example, the charges of water were placed in the unit and emptied from it intermittently over a period of several days. After 300 ml. of such water had been treated by this unit a faint "amber" color appeared in the charge of water. The charge of water, in this case 152 ml., was treated in the unit for one minute and showed a specific resistance of 3,640 ohms. This 152 ml. volume of water was then returned to the unit and treated for an additional 30 seconds. The treated water when examined was found to be colorless and to have a specific resistance of 280,000 ohms.

This unit was used to treat additional amounts of the same well water. It was found that when the quality of the treated water was low, a color could be found in the treated water and that when the quality of the treated water was high no color was apparent. After 1483 ml. of water had been treated, a single charge of 160 ml. of water was found to be colored as described and to have a specific resistance of 5,500 ohms at the end of 30 seconds treatment. After an additional 30 seconds, making a total of one minute of treatment, the water was found to be colored and to have a specific resistance of 35,000 ohms. The same unit volume of water was again returned to the treating unit and agitated for another 30 seconds. The treated water was then found to be colorless and to have a specific resistance of 140,000 ohms. The next charge of water treated by this unit was 140 ml. The indicator material imparted color to the treated liquid at 8,000 ohms specific resistance after 1 minute and 15 seconds treatment in the unit. An additional treatment of 15 seconds produced water with no trace of color having a specific resistance of 50,000 ohms. The total volume of water treated up to this point in this unit was 1,743 ml.

In other tests cited, the period of treatment to secure liquids of desirable quality for various applications was usually no more than one minute. It is noted above, that in this particular unit the time of treatment needed to secure a quality of water correlating with the action of the indicator material was more than one minute.

Having thus disclosed the invention, we claim:

1. The method of evaluating the quality of liquids treated by a loose mass of ion exchange material including an anion exchanger of the quaternary ammonium type, comprising applying to said mass of material an FD & C triphenylmethane indicating dyestuff possessing no deleterious properties from a physiological standpoint, said dyestuff being adsorbed by said material and when adsorbed imparting no substantial change in color to the ion exchange material until such material reaches a state of substantial exhaustion when the color of the dyestuff appears.

2. The method of evaluating the quality of liquids treated by a loose mass of ion exchange material, comprising supplying to the mass of action anion exchange material of the quaternary ammonium type an FD & C triphenylmethane dyestuff certified for use in foods, drugs and cosmetics and which dyestuff is adsorbed without imparting any substantial change in color to the natural color of the active material, but indicating by color change of the ion exchange material when the latter requires regeneration.

3. The method of indicating the quality of liquids treated by ion exchange material, comprising treating a loose mass of active anion exchange material of the quaternary ammonium type with an FD & C triphenylmethane dyestuff certified for use in foods, drugs and cosmetics and in which the dyestuff is adsorbed by said active material without visibly imparting to the latter the color of the dyestuff until said active material has become substantially spent in the treatment of liquids, whereupon said color of the adsorbed dyestuff appears and indicates the condition of the material for ion exchange and the quality of the treated liquid.

4. The method of determining the quality of liquid produced by ion exchange material, comprising treating a mass of active anion exchange material of the quaternary ammonium type with an indicator substance chosen from triphenylmethane dyes certified for use in foods, drugs and cosmetics and which substance is adsorbed by said active material without imparting to the latter the color of said substance until said active material has become substantially spent in the treatment of liquids, whereupon said color appears and indicates the quality of the treated liquid.

References Cited in the file of this patent

Rohm & Haas Co. Bulletin, Amberlite MB-3 Self-Indicating Amberlite for Monobed Deionization, Wash. Square, Philadelphia 5, Pennsylvania, May 1950, 4 pages.